United States Patent [19]

Theorell

[11] 4,303,514

[45] Dec. 1, 1981

[54] FILTER DEVICE

[76] Inventor: Mats Theorell, Nygatan 18, 330 12 Forsheda, Sweden

[21] Appl. No.: 133,116

[22] Filed: Mar. 24, 1980

[30] Foreign Application Priority Data

Mar. 27, 1979 [SE] Sweden ................................ 7902710

[51] Int. Cl.³ ............................................. B01D 27/10
[52] U.S. Cl. ..................................... 210/136; 210/235
[58] Field of Search ................ 210/132, 136, 234, 235

[56] References Cited

U.S. PATENT DOCUMENTS

| | | | |
|---|---|---|---|
| 3,341,019 | 9/1967 | Floakowski | 210/132 |
| 3,363,762 | 1/1968 | Ensign | 210/234 X |
| 3,502,214 | 3/1970 | Mills et al. | 210/235 X |
| 4,035,295 | 7/1977 | Aluequet | 210/136 |
| 4,077,876 | 3/1978 | Southall | 210/235 X |

Primary Examiner—John Adee
Attorney, Agent, or Firm—Holman & Stern

[57] ABSTRACT

The present invention relates to a filtering device for filtering a fluid flowing through the filtering device particularly for use in fluid systems requiring a continuous supply of filtered fluid. When it is necessary to replace or clean removable filter elements at certain intervals. The invention provides a filtering device which allows a continuous fluid supply during the cleaning or replacement of the filter element by providing a plurality of filter chambers connected in parallel which cooperatively functions as bypass chambers which maintan the connection between the inlet and the outlet of the filtering device when at least one filter element is removed.

2 Claims, 1 Drawing Figure

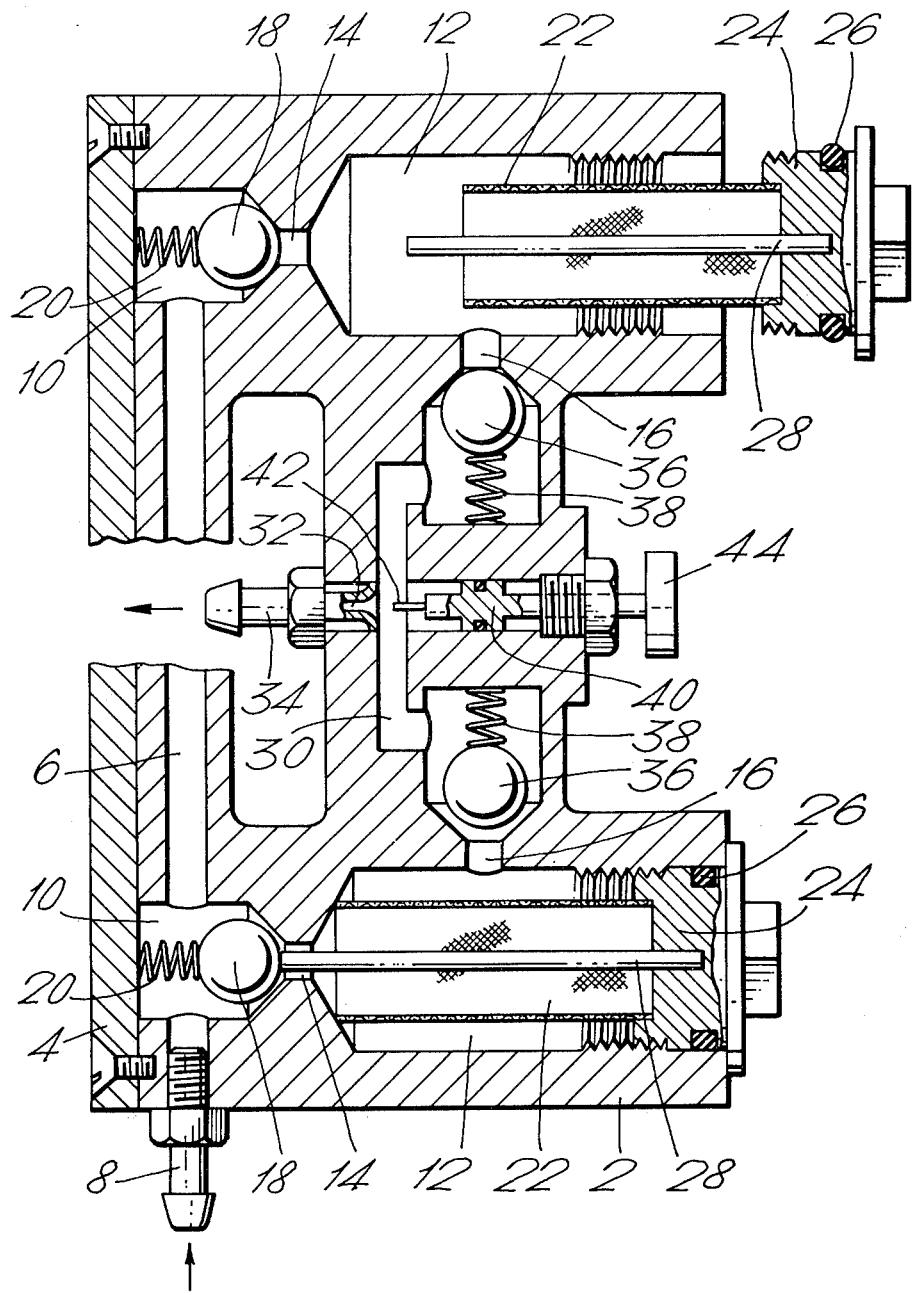

FILTER DEVICE

BRIEF SUMMARY OF THE INVENTION

The present invention relates to a filtering device for filtering a fluid which preferably continuously flows through the filtering device.

Certain constructions require a continuous supply of a fluid for their function. If the fluid supply is interrupted when the construction is operated, the construction can be destroyed. An example of such a construction is a stuffing box sealing for shafts, in which a fluid must be supplied to the space between the shaft and the sealings in order to prevent the sealings from being overheated. Sealings made from polytetrafluoro ethylene are especially sensitive in this respect. It is necessary that the fluid which is supplied to the construction does not contain any contaminants in the form of solid particles, as the sealings can be damaged by such particles. Therefore, it is necessary to direct the fluid through a filtering device before the fluid enters the stuffing box sealing. Also other constructions, for example constructions requiring the supply of a cooling liquid are dependent on the supply of filtered fluid.

Filtering devices of the kind described above comprise a filter element which frequently must be cleaned or replaced. Thereby it is a problem that the supply of fluid to the construction with which the filtering device is connected must be interrupted during the cleaning or replacement operations. This fact can represent a drawback but it is of course even worse if the supply of fluid is interrupted while the said construction is operated, as this leads to damages on the construction.

The object of the present invention is to provide a filtering device which allows a continuous supply of fluid to the construction while the filter element of the filtering device is cleaned or replaced.

In order to comply with this object the filtering device for filtering a fluid flowing through the filtering device comprises an inlet and an outlet, a filter element positioned in a filter chamber between said inlet and said outlet, the filter chamber having an inlet opening and an outlet opening at opposite sides of the filter element, and a closure means which is adapted to close the inlet opening of the filter chamber when the filter element is removed therefrom, the filtering device according to the invention being characterized by a bypass device which is adapted to maintain a connection between the inlet and the outlet of the filtering device at least when the filter element has been removed from the filter chamber and the inlet opening thereto is closed.

It is preferred that the bypass device is constituted by a filter chamber having a filter element positioned between an inlet opening and an outlet opening. Thereby it is suitable that the bypass device comprises a closure means which is adapted to close the inlet opening of the filter chamber of the bypass device when the filter element is removed from said filter chamber. Thus, when the filter element of the bypass device is being replaced or cleaned said first mentioned filter chamber will constitute a bypass device.

When a filtering device according to the invention is used in connection with a certain construction the change or cleaning of the filter element can take place without making it necessary to interrupt the operation of the construction which is supplied with filtered fluid from the filtering device. Also the risk of damaging the construction by interrupting the fluid supply to the construction while the construction is operated is obviated by means of a filtering device according to the invention.

Because of the automatic function of the filtering device with regard to the interruption of the fluid supply to a chamber from which the filter has been removed for cleaning or replacement, there are not required any shut-off valves in connection with the filtering device, which obviates the risk of such a wrong operation of valves which could lead to an interruption of the fluid supply to said construction.

BRIEF DESCRIPTION OF THE DRAWINGS

The invention is described in the following with reference to the accompanying drawing which is a section of an embodiment of a filtering device according to the invention.

DETAILED DESCRIPTION

The filtering device shown in the drawing comprises a housing 2 and a plate 4 connected with the housing by means of bolts or the like. In the housing 2 there is provided an inlet chamber 6, which is supplied with fluid through an inlet stud 8 connected with the chamber. The inlet chamber 6 has two portions 10, each of which is connected with a filter chamber 12. Each filter chamber 12 has an inlet opening 14 and an outlet opening 16. In the portions 10 of the inlet chamber 6 there are provided closure means 18, each of which is biased by means of a spring 20 biasing the closure means against a position wherein the inlet openings 14 of the filter chambers 12 are closed. In each filter chamber 12 there is positioned a substantially cylindrical filter element 22 which is supported by an externally threaded closure plug 24 which is screwable into a threaded portion of the part of the housing 2 which constitutes the filter chamber 12. The plugs 24 are provided with O-ring sealings 26 which provide for a sealed closure of the filter chambers 12 when the plugs 24 are screwed into the housing. Centrally in each plug 24 and centrally extending within the adjacent filter element 22 there is provided a control pin 28 which is adapted to act on the closure means 18 by displacing the closure means 18 against the action of the springs 20 for opening the inlet openings 14 to the chambers 12 when the filter elements 22 are placed in the filter chambers. The position wherein the pin 28 acts on the closure means 18 is shown in the lower part of the drawing. In the upper part of the drawing there is shown how the engagement of the pin 28 with the closure means 18 has been discontinued because of the fact that the filter element has been removed from the filter chamber to be cleaned, the closure means 18 having been displaced by the spring 20 to a position wherein the closure means closes the inlet opening 14 to the filter chamber 12. The action of the spring 20 on the closure means is of course increased by the pressure of the fluid which is supplied to the inlet chamber 6.

The outlet openings 16 from the filter chambers 12 are connected with a common outlet chamber 30 which has a central fluid restricting outlet nozzle 32 and an outlet stud 34. In the outlet chamber 30 there are provided closure means 36 for closing the outlet openings 16 when the pressure in the filter chambers 12 is discontinued because of the fact that the filter elements are removed and the closure means 18 thereby closes the inlet opening 14 to the filter chamber. Thus, the closure means 36 prevent the fluid from backflowing into the filter chambers 12 from the outlet chamber 30 when the filter element 22 has been removed and the closure means 18 closes the inlet opening 14. The closure means 36 are biased by means of springs 38 for retaining the closure function of the closure means 36. A plunger 40 having a cleaning pin 42 is centrally positioned in the outlet chamber 30. The plunger 40 is operable from outside by means of a knob 44 which when pressed inwards provides a displacement of the plunger 40 to a position, wherein the cleaning pin 42 extends into the nozzle 32 for removing contaminants therefrom. In the drawing the cleanable throttling device comprising the nozzle 32, the plunger 40, the cleaning pin 42 and the knob 44 is shown as being a part of the housing 2. If desired it is possible to design said device as a separate unit which is connectable with the housing 2.

For example it is possible to use the filtering device described above for filtering a fluid which is continuously supplied to a stuffing box sealing in order to preventing overheating of the sealings thereof. During the normal operation of the filtering device the two filter elements are positioned in their filter chambers 12, the fluid thereby entering the inlet chamber 6 through the inlet 8. From the inlet chamber 6 the fluid arrives centrally into the filter elements 22 through the open inlet openings of the chambers 12. The fluid flows radially through the filter elements 22 and leaves the filter chambers 12 through the outlet openings 16. From the outlet openings 16 the fluid arrives to the outlet chamber 30 which the fluid leaves through the outlet nozzle 32 and the outlet stud 34.

When it is necessary to clean or replace the filter element 22 it is only necessary to displace one of the filter elements 22 by screwing out the plug 24, whereby the action of the pin 28 on the closure means 18 is interrupted and the closure means 18 closes the inlet opening 14 of the filter chamber 12 from which the filter element is removed. When the fluid pressure of the filter chamber 12 decreases the outlet opening 16 from the filter chamber 12 is closed by the fact that the closure means 36 takes a closed position. Thereby the filter chamber 12 in which the filter element 22 is still positioned maintains the function of the filtering device by filtering the fluid flowing through the filtering device. Thus, all operational functions which are necessary with regard to the changing or cleaning of the filter are automatically obtained when the filter element 22 is removed from the filter chamber 12 without requiring any interruption of the operation of the device which is supplied with filtered fluid from the filtering device. When the filter element has been cleaned or replaced the filter element is again positioned in the filter chamber, whereby the closure means 18 is displaced from the position closing the inlet opening 14 by the pin 28. If desired it is thereupon possible to remove the other filter element 22 for cleaning or replacement, the filter chamber 12 containing the previously cleaned filter element 22 thereby maintaining the filtering function of the filtering device.

The invention can be modified within the scope of the following claims. Thus, it is possible to provide the filtering device with a bypass device which is in function only when the filter elements have been removed for replacement or cleaning. Thereby the filtering device can have one, two or several filter chambers and replacement or cleaning of the filters of all the chambers can take place at the same time. It is also possible to design the bypass device as an open channel without filter element maintaining the connection between the inlet and outlet of the filtering device only at the occasions when cleaning or replacement of the filter elements takes place.

In the specification and claims the expressions filter, filter element, filtering device, filtering and the like are intended to include all devices and methods for removing contaminants from a continuously flowing fluid.

What is claimed is:

1. A filtering device for filtering a fluid flowing through the filtering device, comprising a main inlet and a main outlet, at least two filter chambers each having an inlet opening and an outlet opening, said filter chambers being connected between said main inlet and said main outlet so that said fluid flows through all said filter chambers during normal operation of the device, a removable filter element positioned in each of said filter chambers between said inlet opening and outlet opening thereof, a releasable closure means which is adapted to close the inlet opening of each filter chamber when the filter element is removed therefrom, a control element operatively connected with each said filter element and removably connected to each said filter chamber to maintain said closure means in an open position when said filter element is operatively positioned in the filter chamber, and means responsive to the fluid pressure between said main inlet and main outlet within the filtering device to automatically close said outlet opening of the filter chamber when the filter element is removed therefrom.

2. The filter device as claimed in claim 1, wherein said means to close each said filter chamber outlet opening comprises a check valve in each said outlet opening which is normally open when the filter chamber is in use and which is held closed by said differential pressure.

* * * * *